Figure 1:
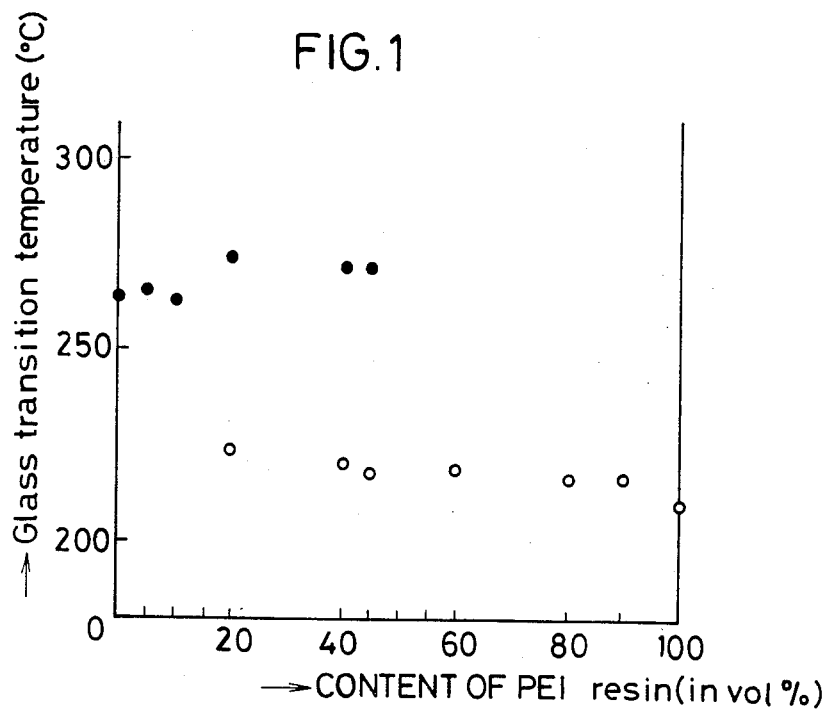

United States Patent [19]

Satoji

[11] Patent Number: 4,599,383

[45] Date of Patent: Jul. 8, 1986

[54] POLYAMIDEIMIDE RESIN COMPOSITION

[75] Inventor: Fuminori Satoji, Kuwana, Japan

[73] Assignee: NTN-Rulon Industries Co., Ltd., Tokyo, Japan

[21] Appl. No.: 667,671

[22] Filed: Nov. 2, 1984

[30] Foreign Application Priority Data

Apr. 28, 1984 [JP] Japan ................................ 59-86704

[51] Int. Cl.$^4$ .......................... C08F 8/30; C08L 77/00
[52] U.S. Cl. .................................... 525/180; 524/495; 524/496; 524/514
[58] Field of Search ................ 525/180; 524/495, 496, 524/514

[56] References Cited

U.S. PATENT DOCUMENTS

| 3,356,760 | 12/1967 | Matray | 525/180 |
| 4,139,576 | 2/1979 | Yoshimura et al. | 525/179 |
| 4,258,155 | 3/1981 | Holub et al. | 525/436 |
| 4,433,104 | 2/1984 | Giles | 525/180 |

Primary Examiner—John C. Bleutge
Assistant Examiner—A. L. Carrillo
Attorney, Agent, or Firm—Armstrong, Nikaido, Marmelstein & Kubovcik

[57] ABSTRACT

A polyamideimide resin composition is proposed which includes a polyamideimide resin, a polyetherimide resin and a fluororesin. The composition not only maintains high mechanical strength and electrical insulation of polyamideimide resin, but also has high thermal shock temperature even in a wet state, high antistick quality and melt-processability.

4 Claims, 2 Drawing Figures

POLYAMIDEIMIDE RESIN COMPOSITION

The present invention relates to a polyamideimide resin composition which has excellent melt-processability, heat resistance, blisterproofness, and antistick quality, and can be produced at low cost.

Polyamideimide resins (hereinafter referred to as PAI resin) have superior heat resistance, chemical resistance, mechanical properties and electrical insulation, and is melt-processable as by extrusion molding and injection molding. On the other hand, they suffer from high water absorption. They become very poor in heat resistance when they absorb a large amount of water. In other words, when a molding of PAI resin is heated rapidly after water absorption, it expands because the moisture therein turns into high-pressure steam. It is well known that the lowest temperature (hereinafter called the thermal shock temperature) at which on a specimen $5 \times \frac{1}{2} \times \frac{1}{8}$ cubic inch, a change in thickness of 25 microns or more occurs with blisters appearing on its surface, drastically decreases after water absorption.

Moldings of PAI resin are seldom used in the absolute dry state, and usually used at a considerably lower temperature than the thermal resistance temperature in the absolute dry state or used while increasing the temperature slowly. In other words, the conditions of use are much restricted. Also, unlike fluororesins, PAI resins lack antistick quality and, therefore, need a coating with fluororesin if antistick quality is required. This not only leads to poor productivity and higher production cost, but also causes peeling due to insufficient bond strength of the coating.

In contrast with PAI resins, polyetherimide resins (hereinafter referred to as PEI resin) exhibit superior high temperature performance. Moreover, they are easily adaptable to the molding cycle employed and can be used with greater freedom in setting the molding conditions. In view of these advantages of PEI resin, as disclosed in the Japanese Patent Laid-open publication No. 58-34828, it has already been proposed to blend in a liquid state a PAI resin with a PEI resin, expecting to improve the properties of these resins and to reduce the production cost. However, no attempts have been so far made to drastically improve the antistick quality and thermal shock temperature simultaneously or individually.

An object of the present invention is to provide a polyamideimide resin composition which obviates the abovementioned shortcomings.

The present invention is based on an unexpected finding that the moldings obtained by blending a PAI resin with a PEI resin, adding a melt-processable, and heat-resistant fluororesin having a good antistick quality, and melt-molding the mixture have an antistick quality comparable to or close to that of fluororesins, maintain high thermal shock temperature even after water absorption, and have a good mechanical strength and melt-processability.

In accordance with the present invention, there is provided a polyamideimide resin composition comprising:

a polyamideimide resin represented by the formula:

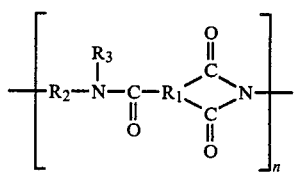

(wherein $R_1$ is a trivalent aromatic radial having at least one benzene ring; $R_2$ is a divalent organic radical; and $R_3$ is hydrogen, a methyl radical or a phenyl radical a polyetherimide resin represented by the formula:

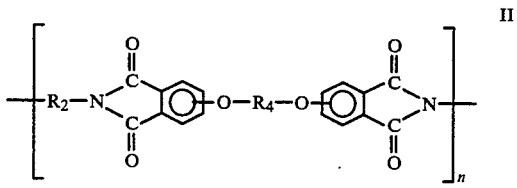

(wherein $R_2$ is a divalent organic radical and $R_4$ is a divalent organic radical having at least one benzene ring), and a fluororesin having a crystalline melting point of 250° C. or higher and a specific melt viscosity of $1 \times 10^3 - 10^6$ poise at $372 \pm 1°$ C., the content of said fluororesin being 10–30% by volume in the entire composition, and the ratio by volume of said polyamideimide resin to said polyetherimide resin being 55:45 to 95:5.

Figure 2:
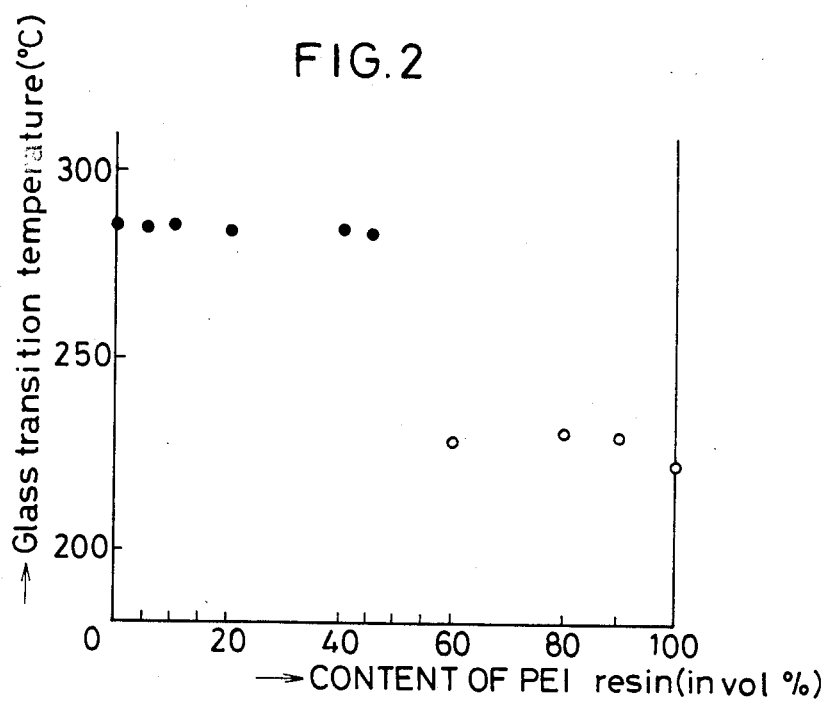

Other objects and features of the present invention will become apparent from the following description taken with reference to the accompanying examples and drawings, in which:

FIG. 1 is a graph showing the relationship between the content of PEI resin and the glass transition temperature Tg measured on samples obtained in the Preliminary Experiments 1–5 and the Comparative Preliminary Experiments 1–5 and not heat-treated, and FIG. 2 is a graph showing the relationship between the content of PEI resin and the glass transition temperature Tg measured on the heat-treated samples. In these figures,   designates Tg corresponding to that of PAI resin and   designates Tg corresponding to that of PEI resin.

The present invention will be described below in more detail.

The aromatic polyamideimide polymer represented in the formula I includes ones in which some of the imide bonds remain in the form of an amide acid bond which is a ring closure precursor. $R_1$ in the formula I designates a trivalent aromatic radical having at least one benzene ring. The two of its three valences are located in two adjacent carbon atoms in the benzene ring of $R_1$ and bonded to the two carbonyl radicals in the formula I. The following are preferred examples of $R_1$:

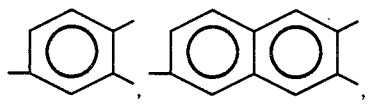
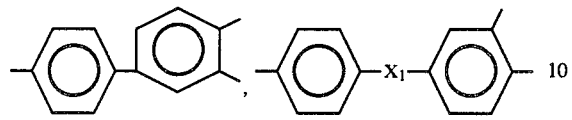

(wherein $X_1$ is

—S—, —O—, —SO$_2$—,

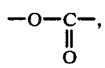

—X$_2$—, or —O—X$_2$—, and X$_2$ is a saturated aliphatic hydrocarbon radical having 1 to 6 carbon atoms such as —CH$_2$— and CH$_3$—CH—CH$_3$). R$_2$ in the formula I designates a divalent organic radical, and its preferred examples include —(CH$_2$)$_m$— (saturated aliphatic hydrocarbon radical wherein m is 4 to 12),

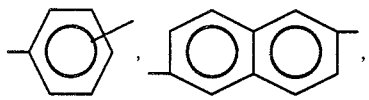

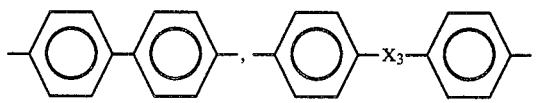

(wherein X$_3$ is —O—, —S—, —SO$_2$—, —C$_y$H$_{2y}$—,

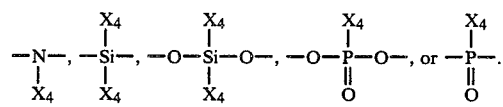

wherein y is an integer of 1 to 3; X$_4$ is an aliphatic hydrocarbon radical or an aromatic radical having 1 to 6 carbon atoms.) R$_3$ in the formula I is hydrogen, a methyl radical or a phenyl radical, as mentioned above.

Various processes for producing such PAI resins are disclosed in detail in the U.S. Pat. Nos. 3,625,911 (Mobil Oil) and 3,611,832 (Standard Oil), and the Japanese Patent Publications Nos. 42-15637 (Standard Oil) and 44-19274 (Hitachi Kasei), 45-2397 (Furukawa Electric), 46-15513 (Teijin), 49-4077 (Toray), and 50-33120 (Sumitomo Electric Industries).

A PAI resin can be produced by, for example, reacting an aromatic tricarboxylic acid anhydride or its derivative as represented by the formula:

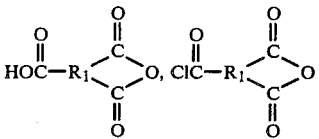

with an organic diamine or its derivative as represented by the formula:

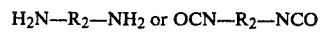

(wherein R$_1$ and R$_2$ are as defined above) in a suitable polar organic solvent such as dimethylacetamide, dimethylformamide and N-methylpyrrolidone, at a proper temperature for a required period of time, to give a polyamide acid, and converting it to an imide as by heating. Typical examples of the PAI resins thus produced include those represented by the following formula.

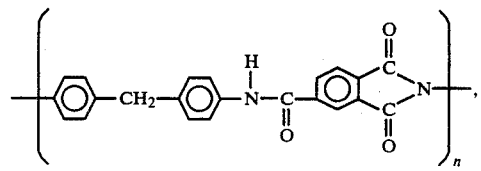

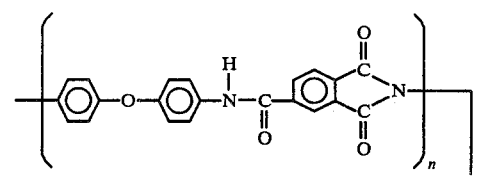

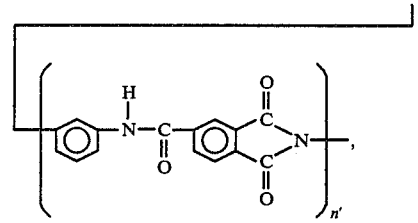

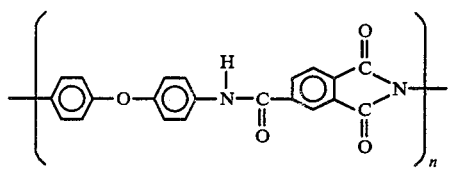

A typical example of such polymers is "Torlon" (a registered trademark of Amoco in the U.S.A.).

The PEI resin used in this invention is represented by the formula II, in which R$_2$ is a divalent organic radical as described before. It should preferably be the same as R$_2$ in the formula I. R$_4$ in the formula II should preferably be any one of the following radicals.

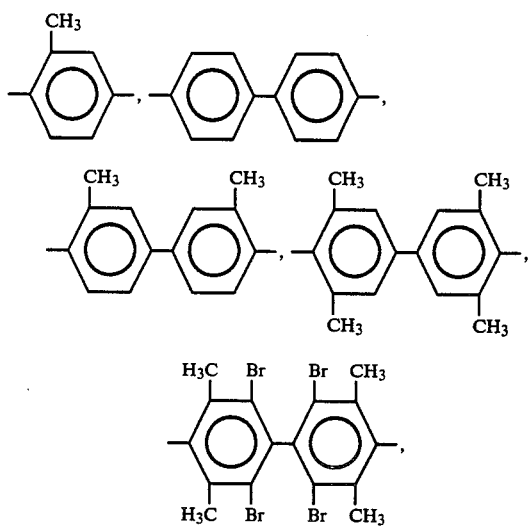

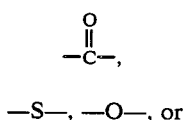

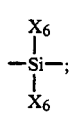

(wherein $X_5$ is $-C_yH_{2y}-$, $$-\overset{O}{\underset{\|}{C}}-,$$

$-S-$, $-O-$, or $$-\underset{X_6}{\overset{X_6}{\underset{|}{\overset{|}{Si}}}}-;$$

y is an integer of 1 to 5; and $X_6$ is a monovalent hydrocarbon radical.)

Various processes for producing such PEI resins are disclosed in detail in the U.S. Pat. Nos. 3,787,475, 3,847,867, and 3,972,902, and the Japanese Patent Publication No. 57-9372 (all to General Electric).

The PEI resin can be produced by, for example, reacting an aromatic bis(ether anhydride) as represented by formula:

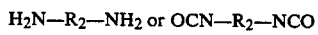

with an organic diamine or its derivative as represented by the formula:

$H_2N-R_2-NH_2$ or $OCN-R_2-NCO$ in a suitable polar organic solvent such as dimethylacetamide, dimethylformamide and N-methylpyrrolidone, at a proper temperature for a required period of time, and treating the reactant by heating, etc. A typical example of PEI resin is "Ultem" (a registered trademark of General Electric in the U.S.A.) which is represented by the following formula.

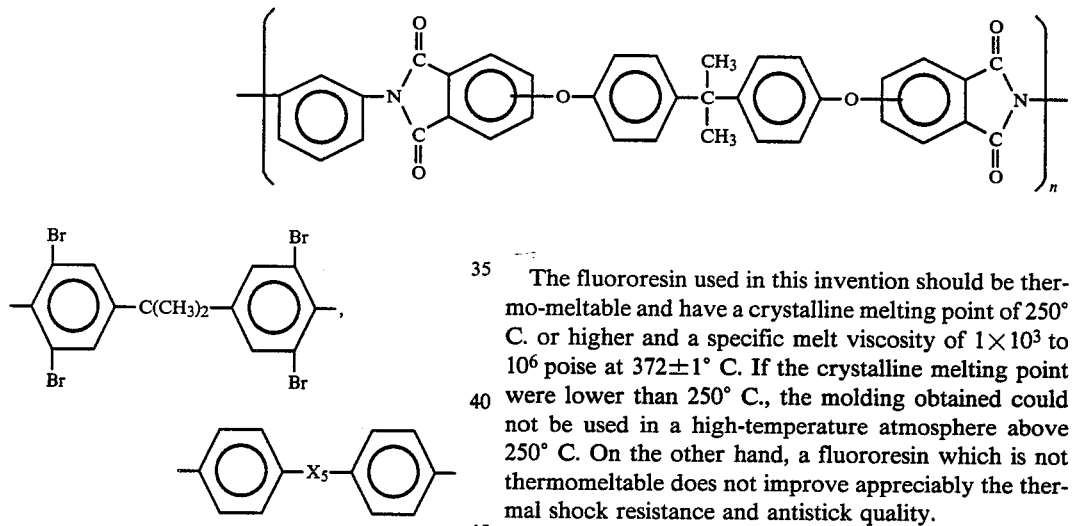

The fluororesin used in this invention should be thermo-meltable and have a crystalline melting point of 250° C. or higher and a specific melt viscosity of $1 \times 10^3$ to $10^6$ poise at $372 \pm 1°$ C. If the crystalline melting point were lower than 250° C., the molding obtained could not be used in a high-temperature atmosphere above 250° C. On the other hand, a fluororesin which is not thermomeltable does not improve appreciably the thermal shock resistance and antistick quality.

Typical examples of preferable fluororesins include a copolymer of tetrafluoroethylene and hexafluoropropylene represented by the following formula:

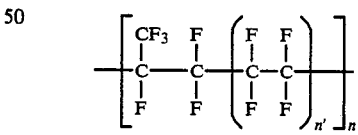

Among typical resins of this type, there are "Teflon FEP-J" (produced by Mitsui Fluorochemical) and "Neoflon FEP" (produced by Daikin Kogyo). Instead of the copolymer, perfluoroalkoxy resins, which are chain fluororesins having a perfluoroalkoxy side chain, may be used. Typical comonomers from which the resins can be obtained are perfluoroalkylfluorovinylpolyethers represented by:

or

wherein $X_7$, $X_8$ and $X_9$ represent fluorine or hydrogen, and Rf represents fluorine or $CF_3$. Typical ones of this type are "Teflon PFA-J" (produced by Mitsui Fluorochemical) and "Neoflon PFA" (produced by Daikin Kogyo). Instead, perfluoroalkoxy resins obtained by copolymerizing a fluoroolefin such as hexafluoropropene, vinylidene fluoride and chlorotrifluoroetylene may be used. Typical is "Teflon EPE-J" (produced by Mitsui Fluorochemical).

The content of fluororesin should be 10 to 30% (by volume) in the composition according to the present invention. If the content were less than 10%, the moldings obtained would not exhibit a sufficient antistick quality and not have a sufficiently high thermal shock temperature in a wet state. If the content were in excess of 30%, the outstanding mechanical strength of PAI resin would be impaired.

The content of the PEI resin in the composition should be such that the ratio of PAI resin to PEI resin is 55:45 to 95:5 by volume. If the content were higher than specified, the composition would have poor heat resistance; if the content were lower than specified, the composition would have poor antistick quality, thermal shock resistance in a wet state, and mechanical strength.

An organic or inorganic filler may be added in such an amount as not to adversely affect the antistick quality and thermal shock temperature of the composition, that is, not more than 10% by volume. Usable fillers include heat-resistant polymeric materials such as polyetheretherketone polyethersulfone and polyimide; heat-resistant fibrous reinforcing materials such as glass fiber, carbon fiber, graphite fiber, potassium titanate whisker, silicon carbide whisker, sapphire whisker, steel wire, copper wire, stainless steel wire, heat-resistant inorganic fiber such as boron fiber or silicon carbide fiber having boron or silicon carbide deposited on tungsten wire or carbon fiber, heat-resistant organic fiber such as aromatic amide fiber; thermal conductivity improver such as graphite, powder of metal such as zinc and aluminum and powder of inorganic compound such as magnesium oxide and zinc oxide; heat insulation improver such as glass beads, silica balloons, diatomaceous earth, magnesium carbonate, and asbestos; lubricity improver such as molybdenum disulfide, graphite, carbon, mica, and talc; and colorant such as iron oxide, cadmium sulfide, cadmium selenide, and carbon black.

In the present invention, the contents of the constituents are indicated in terms of volume. This is because the fillers, if added, differ in specific gravity and hence differ in weight for the same volume. If indicated in terms of weight, their contents could not be defined clearly.

The constituent resins and fillers may be mixed in any conventional way. For example, the PAI resin, PEI resin and fluororesin are dryblended by use of a Henschel mixer, ball mill or tumbler mixer, and the mixture is then fed to an injection molding machine or extrusion machine. Alternatively, they may be melt mixed beforehand in a heated roll, kneader, Banbury mixer or extruder, at 300° to 400° C., preferably 320° to 370° C.

The composition of this invention may be molded by any conventional method such as compression molding, extrusion molding and injection molding. After melt blending the constituents, the mixture may be pulverized by use of a jet mill or cryogenic grinder, and the pulverized powder may be used directly or after classification for fluidized bed dip coating or electrostatic coating.

The molding made from the composition of this invention should preferably undergo heat treatment as is the case with PAI resins. This heat treatment is to keep the moldings at a temperature of 240° to 280° C., preferably 250° to 270° C., for 8 hours or longer, preferably 24 hours or longer. This heat treatment can be easily carried out by use of a circulating hot air oven. The heat treatment improves thermal properties of the moldings such as heat distortion temperature and thermal shock temperature as well as mechanical properties such as flexural strength and flexural modulus. Moreover, after heat treatment the molding shows unchanged heat resistance even in case the ratio of PAI resin to PEI resin is close to 55:45. The high content of PEI resin not only improves the melt processability but also contributes to lower production cost in view of higher cost of PAI resins.

The polyamideimide resin composition of the present invention has excellent mechanical, electrical, and thermal (in the absolute dry state) properties which are characteristics of PAI resins. Moreover, it has low frictional properties, antistick quality and thermal shock resistance in a wet state. It will find application as automotive parts, office machine parts, electrical parts, electronic parts, industrial machine parts, and aircraft and spacecraft parts. The thermal properties, particularly high thermal shock resistance, make it suitable for use at elevated temperatures. The low frictional properties and antistick quality make it suitable for use in applications where lubrication and antistickness are required, e.g. for parts for separating copying papers from a hot rotating member such as a heat roller or a photosensitive member on a copying machine.

The present invention will be described below with reference to the Preliminary and Comparative Experiments and the Examples.

PRELIMINARY EXPERIMENTS 1 TO 5

The PAI resin powder ("Torlon 4000T", produced by Amoco) and the PEI resin powder ("Ultem 1000" produced by General Electric) were dryblended in the ratios (by volume) as shown in Table 1. The mixture was extruded with a twin-screw extruder (Model PCM-30 produced by Ikegai Iron Works, Ltd.) from a strand die (having 7 holes, each 2 mm in diameter) at 340° C. and at a screw speed of 100 rpm. The extruded strands were cut into pellets.

TABLE 1

| Blending ratio | Preliminary Experiment No. | | | | |
|---|---|---|---|---|---|
| % by volume | 1 | 2 | 3 | 4 | 5 |
| Torlon 4000T | 95 | 90 | 80 | 60 | 55 |
| Ultem 1000 | 5 | 10 | 20 | 40 | 45 |

The pellets were formed into square test pieces measuring 50 mm by 50 mm by 3 mm thick by use of an injection molding machine with a barrel temperature of 310° to 360° C., a mold temperature of 220° C., and an injection pressure of 1400 kg/cm². The glass transition temperature Tg of the powder sample scraped from the molded test piece was measured by use of a differential scanning calorimeter (Model DSC-30 produced by Shimadzu Seisakusho). The results are shown in FIG. 1. On the other hand, the test pieces were subjected to heat treatment at 260° C. for 24 hours in an electric circulating hot air oven. The glass transition temperature Tg of the powder sample scraped from the heat-treated test piece was measured in the same way as mentioned above. The results are shown in FIG. 2.

COMPARATIVE PRELIMINARY EXPERIMENTS 1 TO 5

Sample powders were prepared in the same way as in the Preliminary Experiments 1 to 5, except that the ratios of PAI resin to PEI resin were as shown in Table 2. The transition temperature Tg was measured for the heat-treated and not-heat-treated samples. The results of measurements are shown in graphs of FIGS. 1 and 2, respectively.

TABLE 2

| Blending ratio | Comparative Preliminary Experiment No. | | | | |
|---|---|---|---|---|---|
| % by volume | 1 | 2 | 3 | 4 | 5 |
| Torlon 4000T | 100 | 40 | 20 | 10 | 0 |
| Ultem 1000 | 0 | 60 | 80 | 90 | 100 |

It will be noted that when the content of PEI resin is less than 10% for the non-heat-treated compositions (FIG. 1) and less than 45% for the heat-treated compositions (FIG. 2), the glass transition temperature in the lower temperature range considered as corresponding to Tg of PEI resin disappeared, whereas for such a content of PEI resin the compositions showed high glass transition temperatures which is equal or close to Tg of 100% PAI resin. In general, Tg is used as a measure of the softening point or thermal resistance of a given molding. Thus, the above results show that if the content of PEI resin is less than 10% for the non-heat-treated compositions, or less than 45% for the heat-treated composition, moldings having a thermal resistance comparable to that of the moldings made from 100% PAI resin can be obtained. It will be also noted that the heat treatment raises Tg and improves thermal resistance even if the composition is the same.

EXAMPLES 1 TO 4

The same PAI resin powder and PEI resin powder as used in the Preliminary Experiments 1 to 5 and a fluoroplastic were blended in the ratios shown in Table 3, and the mixture was pelletized in the same way as in the Preliminary Experiments 1 to 5. The fluororesins used were fluoroalkoxyethylene resin ("Teflon PFA-340J", a product of Mitsui Fluorochemical) and copolymer of tetrafluoroethylene and hexafluoropropylene ("Teflon FEP-100", a product of Mitsui Fluorochemical). The pellets thus obtained were put into a Brabender plastometer ("Labo Plastomill" made by Toyo Seiki Seisakusho) and their melt torque was measured at 350° C. and a rotor speed of 30 rpm. The results are shown in Table 3.

TABLE 3

| Blending ratio (Vol %) | Example No. | | | |
|---|---|---|---|---|
| | 1 | 2 | 3 | 4 |
| Torlon 4000 | 76 | 64 | 48 | 48 |
| Ultem 1000 | 4 | 16 | 32 | 32 |
| Teflon PFA-340J | 20 | 20 | 20 | — |
| Teflon FEP-100 | — | — | — | 20 |
| Melt torque (kg-cm) | 320 | 250 | 170 | 190 |

COMPARATIVE EXAMPLES 1 TO 4

Pellets were prepared in the same way as in Examples 1 to 4, except that the blending ratios were changed as shown in Table 4. The melt torque was measured for these pellets. The results are also shown in Table 4.

TABLE 4

| Blending ratio (Vol %) | Comparative Example No. | | | |
|---|---|---|---|---|
| | 1 | 2 | 3 | 4 |
| Torlon 4000 | 100 | 80 | 60 | 80 |
| Ultem 1000 | — | 20 | 40 | — |
| Teflon PFA-340J | — | — | — | 20 |
| Teflon FEP-100 | — | — | — | — |
| Melt torque (kg-cm) | 950 | 610 | 490 | 400 |

It is noted from Tables 3 and 4 that the addition of PEI resin or fluororesin to PAI resin decreases the melt torque. The decrease in the melt torque is more significant as shown in Table 3 in the composition of the present invention in which the three resins are blended together. This indicates that the composition of this invention has excellent melt processability.

EXAMPLES 5 TO 11

Pellets were prepared in the same way as in the Preliminary Experiments 1 to 5, using the same PAI resin, PEI resin, and fluororesin as used in the Examples 1 to 4, and graphite powder ("ACP" made by Nippon Kokuen). The blending ratios are shown in Table 5. The pellets obtained were injection molded in the same way as in the Preliminary Experiments 1 to 5, and the moldings were heat-treated at 260° C. for 24 hours. Their mechanical and antistick properties were measured. The results are shown in Table 5. The mechanical properties tested include flexural strength (kg/cm²) and flexural modulus (kg/cm²) both measured in accordance with ASTM-D790 and Izod impact strength (kg-cm/cm) measured in accordance with ASTM-D256 (with notch, ⅛ inch). The antistick quality was estimated by measuring the contact angle of a water drop placed on a test piece in the form of a square piece 25 mm by 25 mm by 3 mm (thick) with a goniometer (Model G-I, made by Eruma Kogaku).

COMPARATIVE EXAMPLES 5 TO 7

Samples were prepared in the same way as in the Examples 5 to 11, except that the blending ratios were changed as shown in Table 5 and that the fluororesin used in the Comparative Example 7 was tetrafluoroethylene resin (Teflon TLP-10) made by Mitsui Fluorochemical) which had a crystalline melting point of 323° C. and a specific melt viscosity of higher than $1\times10^{10}$ poise at $372\pm°$ C. The same properties of the samples were measured in the same way as in the Examples 5 to 11. The results are shown in Table 5. The composition of the Example 5 is the same as that of the Comparative Preliminary Example 1 and that of the Comparative Example 1.

It will be noted from Table 5 that the compositions of the present invention in the Examples 5-11 have balanced mechanical properties, show a large contact angle comparable to that of fluororesin, and outstanding antistick quality. It is also noted from the result of the Comparative Example 6 that the composition containing fluororesin but no PEI resin shows poor flexural strength and wide variation in contact angles. In the Comparative Example 5 in which no fluororesin is used and in the Comparative Example 7 in which the fluororesin used was not suitable, the compositions obtained show a very small contact angle and thus a good antistick quality cannot be expected.

EXAMPLES 12 TO 18

Samples were prepared with the same blending ratios as in the Examples 5-11 and "Toron 4000T" (product of Amoco) was used as a PAI resin and "Ultem 1000-9999" (product of Engineering Plastic) was used as a PEI resin. After heat treatment at 260° C. for 24 hours, the test specimens were dipped in hot water at 90° C. for water absorption test. The water absorption was calculated by use of the following formula:

$$\frac{W_1 - W_0}{W_0} \times 100 \ (\%)$$

wherein $W_0$ is the weight of the test specimen measured immediately after heat treatment, and $W_1$ is the weight of the test specimen measured after immersion in hot water. The results are shown in Table 6. After water absorption, the test pieces were placed on hot plates at varied temperatures for 5 minutes, and the surfaces of the test pieces in contact with the hot plate were observed. The thermal shock temperature given in Table 6 is the lowest temperature at which blister or a dimensional change more than 25 mm appeared on the contact surface. High thermal shock temperature means that the test piece has a high heat resistance even after it has absorbed water.

COMPARATIVE EXAMPLES 8 TO 11

Test pieces were prepared in the same way as in the Examples 12 to 18, except that the blending ratios were changed as shown in Table 6. The water absorption and thermal shock temperature were measured. The results are shown in Table 6.

It will be noted from Table 6 that as compared with the one comprised of PAI resin alone (Comparative Example 8), the compositions of this invention have lower water sbsorption and higher thermal shock temperature by 45° to 70° C., and thus have excellent heat resistance.

TABLE 5

| No. | Example | | | | | | | Comparative Example | | |
|---|---|---|---|---|---|---|---|---|---|---|
| | 5 | 6 | 7 | 8 | 9 | 10 | 11 | 5 | 6 | 7 |
| Blending ratio (% by vol) | | | | | | | | | | |
| Torlon 4000T | 76 | 64 | 54 | 48 | 48 | 46 | 42 | 100 | 80 | 48 |
| Ultem 1000 | 4 | 16 | 36 | 32 | 32 | 31 | 28 | | | 32 |
| Teflon PFA-340J | 20 | 20 | 10 | 20 | | 17 | 30 | | 20 | |
| Teflon FEP-100 | | | | | 20 | | | | | |
| Teflon TLP-10 | | | | | | | | | | 20 |
| Graphite ACP | | | | | | 6 | | | | |
| Flexural strength (Kg/cm$^2$) | 400 | 440 | 1100 | 630 | 600 | 740 | 520 | 1900 | 310 | 620 |
| Flexural modulus (Kg/cm$^2$) | $2.1\times10^4$ | $2.2\times10^4$ | $3.2\times10^4$ | $2.9\times10^4$ | $3.0\times10^4$ | $4.2\times10^4$ | $2.2\times10^4$ | $4.3\times10^4$ | $1.9\times10^4$ | $2.9\times10^4$ |
| Impact strength (Kg-cm/cm) | 4.2 | 4.2 | 6.7 | 4.6 | 4.5 | 3.3 | 4.0 | 12.9 | 3.9 | 4.1 |
| Contact angle (degree) | | | | | | | | | | |
| (average) | 98 | 100 | 110 | 116 | 117 | 115 | 75 | 92 | 80 | |
| (dispersion) | 17 | 13 | 13 | 10 | 10 | 15 | 13 | 8 | 35 | 17 |

TABLE 6

| No. | Example | | | | | | | Comparative Example No. | | | |
|---|---|---|---|---|---|---|---|---|---|---|---|
| | 12 | 13 | 14 | 15 | 16 | 17 | 18 | 8 | 9 | 10 | 11 |
| Blending ratio (% by vol) | | | | | | | | | | | |
| Torlon 4000T | 76 | 64 | 54 | 48 | 48 | 46 | 42 | 100 | 80 | 48 | 52 |
| Ultem 1000-9999 | 4 | 16 | 36 | 32 | 32 | 31 | 28 | | | 32 | 35 |
| Teflon PFA-340J | 20 | 20 | 10 | 20 | | 17 | 30 | | 20 | | |
| Teflon FEP-100 | | | | | 20 | | | | | | |
| Teflon TLP-10 | | | | | | | | | | 20 | |
| Graphite ACP | | | | | | 6 | | | | | 13 |
| Water absorption (%) | 3.4 | 2.9 | 2.4 | 2.0 | 2.0 | 2.0 | 1.7 | 4.1 | 3.8 | 2.0 | 2.0 |
| Thermal shock temperature (°C.) | 265 | 275 | 255 | 280 | 255 | 280 | 275 | 210 | 260 | 220 | 225 |

What are claimed are:

1. A polyamideimide resin composition comprising:
a polyamideimide resin represented by the formula:

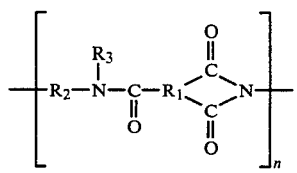

(wherein $R_1$ is a trivalent aromatic radical having at least one benzene ring; $R_2$ is a divalent organic radical; and $R_3$ is hydrogen, a methyl radical or a phenyl radical)

a polyetherimide resin represented by the formula:

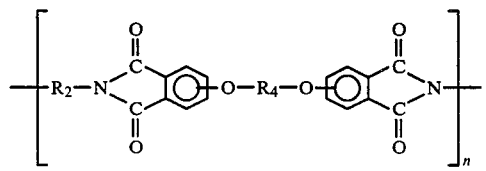

(wherein $R_2$ is a divalent organic radical and $R_4$ is a divalent organic radical having at least one benzene ring), and a fluororesin having a crystalline melting point of 250° C. or higher and a specific melt viscosity of $1 \times 10^3 - 10^6$ poise at $372 \pm 1°$ C., the content of said fluororesin being 10–30% by volume in the entire composition, and the ratio by volume of said polyamideimide resin to said polyetherimide resin being 55:45 to 95:5.

2. A polyamideimide resin composition as claimed in claim 1, wherein said fluororesin is a copolymer of tetrafluoroethylene and hexafluoropropylene.

3. A polyamideimide resin composition as claimed in claim 1, wherein said fluororesin is a perfluoroalcoxy resin.

4. A polyamideimide resin composition as claimed in claim 1, further comprising not more than 10 percent by volume of an organic or inorganic filler.

* * * * *